(No Model.)  F. J. SEMAL.  2 Sheets—Sheet 1.
MICROPHONE.

No. 309,742.  Patented Dec. 23, 1884.

Witnesses
R. S. N. Kirkpatrick
W. F. E. Kirkpatrick

Inventor
Dr. Fris. Jh. Semal (No Model.)

F. J. SEMAL.
MICROPHONE.

No. 309,742. Patented Dec. 23, 1884.

Witnesses
R. S. Kirkpatrick
W. F. Kirkpatrick

Inventor
Wm Fran. J. Semal

UNITED STATES PATENT OFFICE.

FRANÇOIS J. SEMAL, OF MONS, BELGIUM.

MICROPHONE.

SPECIFICATION forming part of Letters Patent No. 309,742, dated December 23, 1884.

Application filed December 18, 1883. (No model.) Patented in Belgium November 27, 1883, No. 63,372; in France November 27, 1883, No. 158,804; in Italy December 31, 1883, XVII, 16,180; in Austria-Hungary February 3, 1884, No. 44,693 and No. 3,941, and in England March 31, 1884, No. 5,719.

*To all whom it may concern:*

Be it known that I, FRANÇOIS JOSEPH SEMAL, a Belgian subject, residing at Mons, in the Kingdom of Belgium, have invented certain new and useful Improvements in Microphones, (for which I have obtained provisional protection in Great Britain, No. 5,719, dated March 31, 1884, and patents in Belgium, dated November 27, 1883, No.63,372; in France, dated November 27, 1883, No. 158,804; in Austria-Hungary, dated February 3, 1884, No. 44,693 and No. 3,941, and in Italy, dated December 31, 1883, No. 16,180,) of which the following is a specification.

My invention relates to an improved construction and arrangement of microphones, which I call "simplex microphones;" and it is illustrated in the accompanying drawings, in which—

Figure 2:
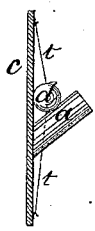
Figure 1:
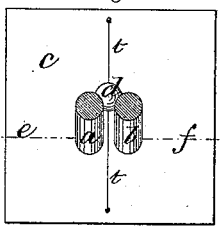
Figure 4:
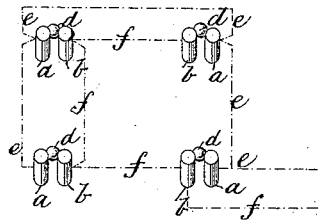
Figure 3:
Figure 5:
Figure 6:
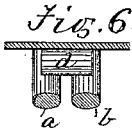
Figures 7, 8:
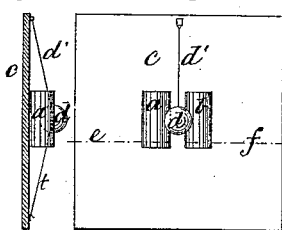
Figure 12:
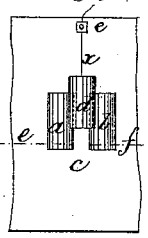
Figure 10:
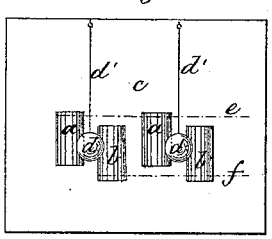
Figure 11:
Figure 9:
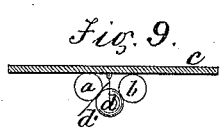
Figure 13:
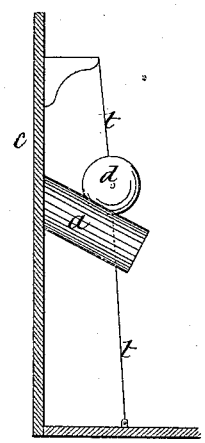
Figure 15:
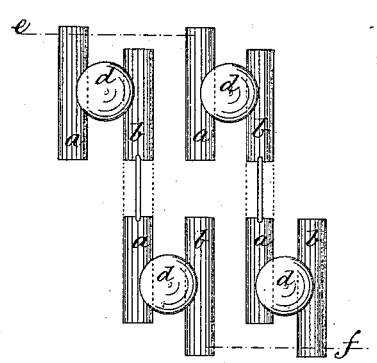
Figure 17:
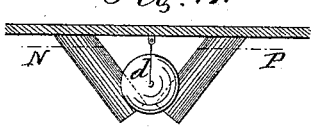
Figure 16:
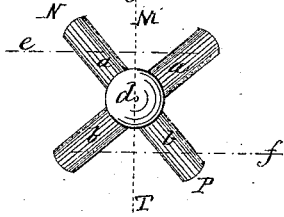
Figure 14:
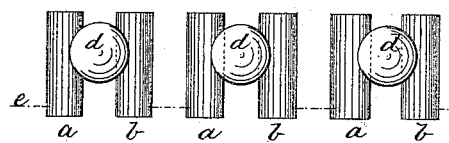
Figure 18:
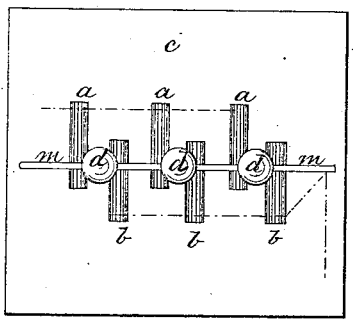
Figure 19:
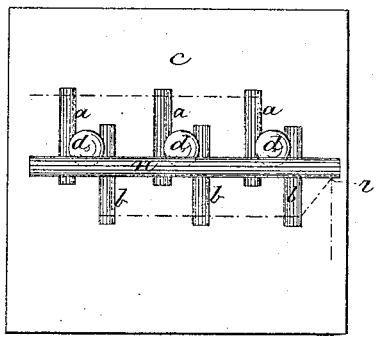

Figure 1 is an elevation of a single simplex microphone element. Fig. 2 is a side elevation of the same with the diaphragm in section. Fig. 3 is a top view of the same. Fig. 4 shows a series of simplex elements connected with the battery and line. Figs. 5 and 6 represent modifications in the arrangement of simplex elements. Figs. 7, 8, and 9 show, respectively, front, side, and top views of a modified form wherein the carbon electrodes are secured lengthwise to the plate. Figs. 10 and 11 show front and side views of two simplex microphone elements connected of the kind shown separately in Figs. 7, 8, and 9. Fig. 12 is a modification wherein a cylinder is substituted for a ball. Fig. 13 shows a modification of simplex element attached to a vertical plate. Fig. 14 shows three simplex elements combined in one plate. Fig. 15 shows four of such elements combined. Fig. 16 shows another modification in arrangement. Fig. 17 shows a top view of the same. Fig. 18 shows a microphone in combination with an equalizer. Fig. 19 is another form of equalizer.

Upon a suitable plate or flat piece of wood, cork, ebonite, metal, or other suitable material capable of vibrating under the shock of a wave of sound, hereinafter called "the plate," I affix one or several microphonic elements, which I call "simplex microphonic elements." Each of the said simplex microphonic elements consists of two small cylinders of hard carbon, about three-quarters of an inch to an inch long, and a little ball of the same material—say of about three-eighths to three-quarters of an inch diameter—which rests between and in contact with the exteriors of both cylinders. The said cylinders and ball may be arranged in various ways, according to the position of the transmitter and according to the number of elements affixed to it. The two small carbon cylinders are glued onto or otherwise attached to the plate, so as to be near each other—say from about one-eighth to three-eighths of an inch apart—and a thin copper wire wound once or twice round each of the said cylinders puts them in communication one with a suitable pile, (either directly or through the induction-wire of an induction-coil,) and the other with a suitable telephone-receiver provided with its usual automatic commutator. The little ball of carbon is placed freely on and between the cylinders, and thus closes the circuits by its tangential points of contact with the two cylinders.

In each particular case different causes contribute to keep the little ball in contact with the cylinders, and at the same time to cause both the points of contact and the pressure at the points of contact to vary. To produce these effects the action of gravity may be employed alone, or a certain amount of pressure may be added to it, such pressure being produced by the tension of a thin silk thread or copper wire passed through a hole pierced diametrically through the ball, and the ends of which thread or wire are attached to the top and bottom of the plate, respectively; or for the little carbon ball may be substituted a conductor made also of hard carbon, the shape of which is so calculated that by lowering it, or by causing it to bear more or less against the cylinders, the number and position of the points of contact may be increased or diminished at will; and here also the pressure produced by the tension of a thread is applicable. Thus in certain cases, when it is required to regulate at will the sensitiveness of the apparatus, a cylindrical piece of carbon about from three-eighths to three-quarters of an inch long may be substituted for the carbon ball.

The delicacy of the contacts and the facility with which they may be varied render the apparatus remarkably sensitive to the waves of sound which strike it, either directly or indirectly, through the medium of a vibratory plate upon which it is fixed. It also constitutes really a microphonic element or unit, the number and arrangement of which units may vary according to the resistance, conditions of the lines, the receivers, the piles, &c. Should one microphonic element not be sufficient, several of the said elements may be used upon the same vibratory plate by arranging them either in a horizontal or vertical line in the shape of a triangle, a lozenge, a square, or a circle, or other suitable shape, and in such cases the cylinders which receive the current from the pile are connected together, as are also the cylinders in communication with the telephone—that is to say, the elements are arranged in quantity—or each cylinder is connected successively to one of the cylinders of the next element taken as the terminal. By this arrangement the elements are arranged in series or in tension. The elements may also be associated in quantity and in tension. When the plate is vertical, the two small cylinders are slightly beveled at the end by which they are attached to the said plate. They thus form with the plate an angle of about from fifty to eighty degrees. Owing to the inclination of the cylinders, the ball rests not only upon the said cylinders, but bears also against the vibratory plate, either directly or through a washer of cork or other suitable material capable of deadening the trepidation and the shocks of the ball against the plate; or a carbon rest of flat, spherical, cylindrical, or other suitable shape, adhering to the plate, may be used for the purpose.

Figs. 1, 2, and 3 of the accompanying drawings represent such a simplex element attached to a vertical vibratory plate. Fig. 1 represents it by a front view, Fig. 2 by a side view, and Fig. 3 by a plan. $a$ $b$ are the two carbon cylinders, affixed by their beveled ends to the plate $c$, and forming an angle with the said plate. $d$ is the little ball, which rests upon the cylinders $a$ $b$ and bears against the plate $c$. A thin copper wire, $e$, wound once or twice around the lower part of the cylinder $a$, puts the cylinder $a$ in communication with the telephone-receiver. A similar wire, $f$, wound round the cylinder $b$, puts the said cylinder $b$ in communication with the pile.

Fig. 4 illustrates the mode of coupling together several of the said simplex microphonic elements upon the same plate. $a$ $b$ are the carbon cylinders. $d$ $d$ are the little balls. $e$ $e$ is the telephone-wire passing from one of the cylinders, $a$, to another. $f$ is the pile-wire which passes from one to another of the cylinders $b$.

As shown in Figs. 1 and 2, a tension thread or wire, $t$ $t$, may be used to add to the pressure of the ball $d$, the said thread or wire passing through the ball, and being attached by both ends to the plate $c$.

Fig. 13 represents another arrangement of the simplex element upon a vertical plate, $c$. In this case the carbon cylinders are inclined downward, and the ball $d$ is kept in position by the rod or wire $t$ $t$.

Instead of the carbon cylinders being affixed to the plate by their ends, the said cylinders may be attached to the plate vertically—that is to say, in the direction of their length—by flattening them on one side and attaching them to the plate by their flat side, the said cylinders being placed a little distance apart—say from about one-eighth to three-eighths of an inch—and the ball is suspended to a thread affixed to the upper part of the plate, and by the action of gravity is kept in contact with the two cylinders; or the thread may be attached by its ends both to the top and to the bottom of the plate, and thus cause the ball to press more or less against the said plate. This arrangement is represented in Figs. 7, 8, and 9, Fig. 7 being a front view, Fig. 8 a side view, and Fig. 9 a plan. $a$ and $b$ are the two carbon cylinders, attached lengthwise upon the plate $c$. $d$ is the little ball suspended to the tension-thread $d'$, the lower part, $t$, of which thread is fixed to the bottom of the plate $c$. $e$ is the telephone-wire, and $f$ is the pile-wire.

Figs. 10 and 11 represent a front view and a side view, respectively, illustrating the mode of coupling on the same plate two of the said microphonic elements. As in Figs. 7, 8, and 9, $a$ $b$ are the carbon cylinders, and $c$ is the plate to which they are attached. $d$ $d$ are the carbon balls, and $e$ is the wire wound round the cylinders $a$ $a$ and conducting to the telephone, and $f$ is the wire wound round the cylinders $b$ $b$ and conducting to the pile. Fig. 14 shows three of the said simplex elements combined in series or in tension.

Fig. 15 represents four of the said elements combined both in tension and in quantity. When it is deemed preferable to place the transmitter horizontally upon a table, the cylinders may be fixed lengthwise upon the plate, and small stops attached upon the said plate to prevent the ball from falling off, or a thread attached to the plate may be used for the same purpose; or the ball may be placed between four of the carbon cylinders attached obliquely upon the plate, the said ball thus bearing upon the ends of the said cylinders, which together form an inverted quadrangular pyramid or a sort of basket. The cylinders at each side of the pyramid are connected together by a wire conductor, by which means they are assimilated to a single terminal. The two terminal poles P N are inserted in the electric circuit, as stated above. This arrangement is represented in plan at Fig. 17 and in elevation at Fig. 18.

The apparatus is regulated by acting upon its sensitive parts.

The sensitiveness of the apparatus depends upon that of the vibratory plate, and more or less upon its thickness, its nature, the mode of attachment, &c.; also upon the distance between the cylinders, giving more or less stability to the ball or other conductor in contact with them; also upon the weight of the carbon conductor or ball, which has a certain influence upon the facility with which the pressure may be varied at the points of contact; also upon the pressure communicated by the tension-thread upon the points of contact, and lastly upon the unity of action of all the different simplex elements employed. All these conditions may easily be fulfilled according to the requirements.

It is obvious that the nearer to each other the carbon cylinders are placed the greater will be the sensitiveness of the microphonic element, as then the variations of the ball's contact will be more easily produced.

The weight of the ball may be varied either by attaching to it a metal mounting, so as not to interfere with the points of contact, or by passing through it a more or less heavy metal pin, or in any other suitable manner.

As previously stated, in substitution for the ball hereinbefore described, a heavier carbon conductor may be used—such as a piece of cylindrical carbon about three-eighths to three-fourths of an inch long—and that end of the said cylindrical carbon which touches the plate is rounded, as shown in plan in Fig. 6; or the third small cylinder $d$ may be laid across the cylinders $a\,b$, as represented in Fig. 8. When for the little balls $d$ are substituted carbon cylinders or other shaped conductors, the said cylinders or conductors are suspended to a little thread, $x$, as represented in Fig. 12, and at the point of suspension of the said thread the plate $c$ is provided with a small regulating apparatus, $e$, to enable the thread to be lengthened or shortened, and thus to establish more or less contact between the three cylinders $a\,d\,b$.

The tension of the thread may be produced by means of a screw, a pin, or other suitable means; or for the said thread may be substituted a rigid metal rod or thick wire screwed at its upper end, and upon the screwed part of the said rod or wire is placed a screw-box, which may be brought nearer to or farther from the ball, so as to increase or diminish the pressure upon it.

To render the microphonic impressions uniform when the elements are grouped together in quantity, the balls or conductors may be connected together by means of an equalizer, (shown in Fig. 18)—that is to say, a simple conducting-wire or small copper rod, $m$, passing through holes in the balls diametrically, the said wire or rod $m$ being insulated at one end, and by its other end connected to the telephone-wire. The same effect may be produced by means of a carbon or metal rod placed before the balls so as to form a third support for them. This arrangement is represented in Fig. 19. $n$ is the equalizer, made of metal or of carbon, placed about three-eighths of an inch in front of cylinders $a\,a\,b\,b$, and by its ends affixed to the plate $c$, and at the point $r$ communicating with the wire connecting the cylinders $a\,a\,a$, and leading to the telephone-receiver.

Having fully described my invention, what I desire to claim and secure by Letters Patent is—

1. The combination of a vibratory diaphragm, two cylindrical electrodes secured to the diaphragm in proximity to each other, and a circular electrode bridging the space between the two cylindrical electrodes, and in superficial contact with the exterior and convex surfaces of both the latter, substantially as described.

2. In a microphone, the combination of a single diaphragm, carbon standards mounted thereon, a carbon ball in contact with such standards, and a tension-thread, substantially as described.

FÇOIS. J. SEMAL.

Witnesses:
R. S. KIRKPATRICK,
H. T. E. KIRKPATRICK.